(12) United States Patent
Marcum et al.

(10) Patent No.: US 11,073,411 B2
(45) Date of Patent: Jul. 27, 2021

(54) PRESSURE PASS-THROUGH APPARATUS, AND METHOD FOR MAKING SUCH

(71) Applicants: Oregon State University, Corvallis, OR (US); Battelle Energy Alliance, LLC, Idaho Falls, ID (US)

(72) Inventors: Wade R. Marcum, Corvallis, OR (US); Aaron W. Weiss, Corvallis, OR (US); Daniel P. Labrier, Corvallis, OR (US); Casey Jesse, Idaho Falls, ID (US); Warren F. Jones, Idaho Falls, ID (US); John Kennedy, Idaho Falls, ID (US); Ann Marie Phillips, Idaho Falls, ID (US); Chad Nixon, Corvallis, OR (US)

(73) Assignees: Oregon State University, Corvallis, OR (US); Battelle Energy Alliance, LLC, Idaho Falls, ID (US)

( * ) Notice: Subject to any disclaimer, the term of this patent is extended or adjusted under 35 U.S.C. 154(b) by 141 days.

(21) Appl. No.: 16/357,124

(22) Filed: Mar. 18, 2019

(65) Prior Publication Data

US 2019/0360844 A1    Nov. 28, 2019

Related U.S. Application Data

(60) Provisional application No. 62/648,959, filed on Mar. 28, 2018.

(51) Int. Cl.
| | |
|---|---|
| *G01D 5/26* | (2006.01) |
| *G02B 6/44* | (2006.01) |
| *G01D 11/30* | (2006.01) |
| *G02B 6/42* | (2006.01) |

(52) U.S. Cl.
CPC ............. *G01D 5/268* (2013.01); *G01D 11/30* (2013.01); *G02B 6/443* (2013.01); *G02B 6/4428* (2013.01); *G02B 6/42* (2013.01)

(58) Field of Classification Search
CPC .......... G01D 5/268; G01D 5/26; G01D 11/30; G02B 6/443; G02B 6/4428; G02B 6/44; G02B 6/36; G02B 6/42
USPC .............................................. 385/12, 13, 37
See application file for complete search history.

(56) References Cited

U.S. PATENT DOCUMENTS

| | | | |
|---|---|---|---|
| 4,687,293 A | 8/1987 | Randazzo | |
| 7,628,079 B2 | 12/2009 | Sato et al. | |
| 7,856,888 B2 | 12/2010 | Ferguson | |
| 2002/0154860 A1* | 10/2002 | Fernaid ................. | G01L 11/025 385/37 |
| 2010/0329602 A1* | 12/2010 | Shah ...................... | G02B 6/022 385/13 |

* cited by examiner

*Primary Examiner* — Michael P Mooney
(74) *Attorney, Agent, or Firm* — Green, Howard & Mughal LLP (57) ABSTRACT

An apparatus is provided which comprises pressure pass-thru means, which includes: an optic fiber having a first end and a second end; a first connector coupled to the first end; a second connector coupled to the second end; a housing between the first and second ends, wherein the housing covers a portion of the optic fiber, wherein a portion of the optic fiber in the housing is bare; a filing material inside the housing; and a swaged gland fitting on the housing to secure the apparatus to a pressure boundary.

20 Claims, 5 Drawing Sheets

PRESSURE PASS-THROUGH APPARATUS, AND METHOD FOR MAKING SUCH

CLAIM OF PRIORITY

This application is a National Stage Entry of, and claims priority to, U.S. Provisional Application No. 62/648,959, filed on 28 Mar. 2018 and titled "PRESSURE PASS-THROUGH APPARATUS, AND METHOD FOR MAKING SUCH", which is incorporated by reference in its entirety for all purposes.

GOVERNMENT INTEREST STATEMENT

Embodiments of this invention are made with government support under Contract No. DE-AC07-05ID14517 awarded by Department of Energy. The government has certain rights in the invention.

BACKGROUND

There are presently a number of measurement techniques and methods that leverage fiber-optical means (transport of light to acquire measurement). The use of optics provides many benefits relative to other approaches such as resistive, capacitive, inductive, etc. for a variety of applications.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION OF EXEMPLARY EMBODIMENTS

There are presently several existing products which leverage the use of optical fibers for the acquisition of strain measurement; two examples include National Instruments® and LUNA®. This advanced method for acquiring strain-based characteristics is readily applied in a variety of environments including air, water, liquid sodium, liquid salts, and others.

However, there are limitations for which the state conditions of these fluid environments must maintain in order to use this technique. The most limiting condition is the pressure under which these fibers are exposed, specifically, present available technology is limiting in available products, which provide a pressure boundary penetration (e.g., a method for passing an optical fiber from an atmospheric environment to a high-pressure environment). There are a few available products, which are developed and are marketed to serve this purpose. However, these products are explicitly shown to provide low-reliability and are significantly expensive. Therefore, there remains a need for an inexpensive and reliable means using optical techniques to measure strain in a non-ambient environment (e.g., high pressure, elevated temperature, corrosive, caustic, etc.) and transmit that signal through optical fiber to the ambient environment.

Some embodiments describe a pressure pass-through apparatus for distributed strain sensor. In some embodiments, the pressure pass-through apparatus is assembled with readily available components configured in a novel and simple configuration to produce a highly reliable and very economical solution to passing optical fibers from a low-pressure environment to an elevated pressure. Specific selection of materials for the apparatus may vary depending upon the specifics of the operating conditions and application(s), however, the relative configuration of this integrated assembly may not change.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, optical, mechanical, or magnetic connection between the things that are connected, without any intermediary devices.

The term "coupled" means a direct or indirect connection, such as a direct electrical, optical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "module" or "logic" may refer to one or more passive and/or active components that are arranged to cooperate with one another to provide a desired function.

The term "signal" may refer to at least one current signal, voltage signal, magnetic signal, optical, ultrasound, or data/clock signal.

The term "fiber" refers to an optical fiber, which can carry light of one or more wavelengths.

The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus, which comprises the device.

The term "scaling" generally refers to converting a design (schematic and layout) from one process technology to another process technology and subsequently being reduced in area (e.g., layout area).

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

It is pointed out that those elements of the figures having the same reference numbers (or names) as the elements of any other figure can operate or function in any manner similar to that described, but are not limited to such.

Figure 1:
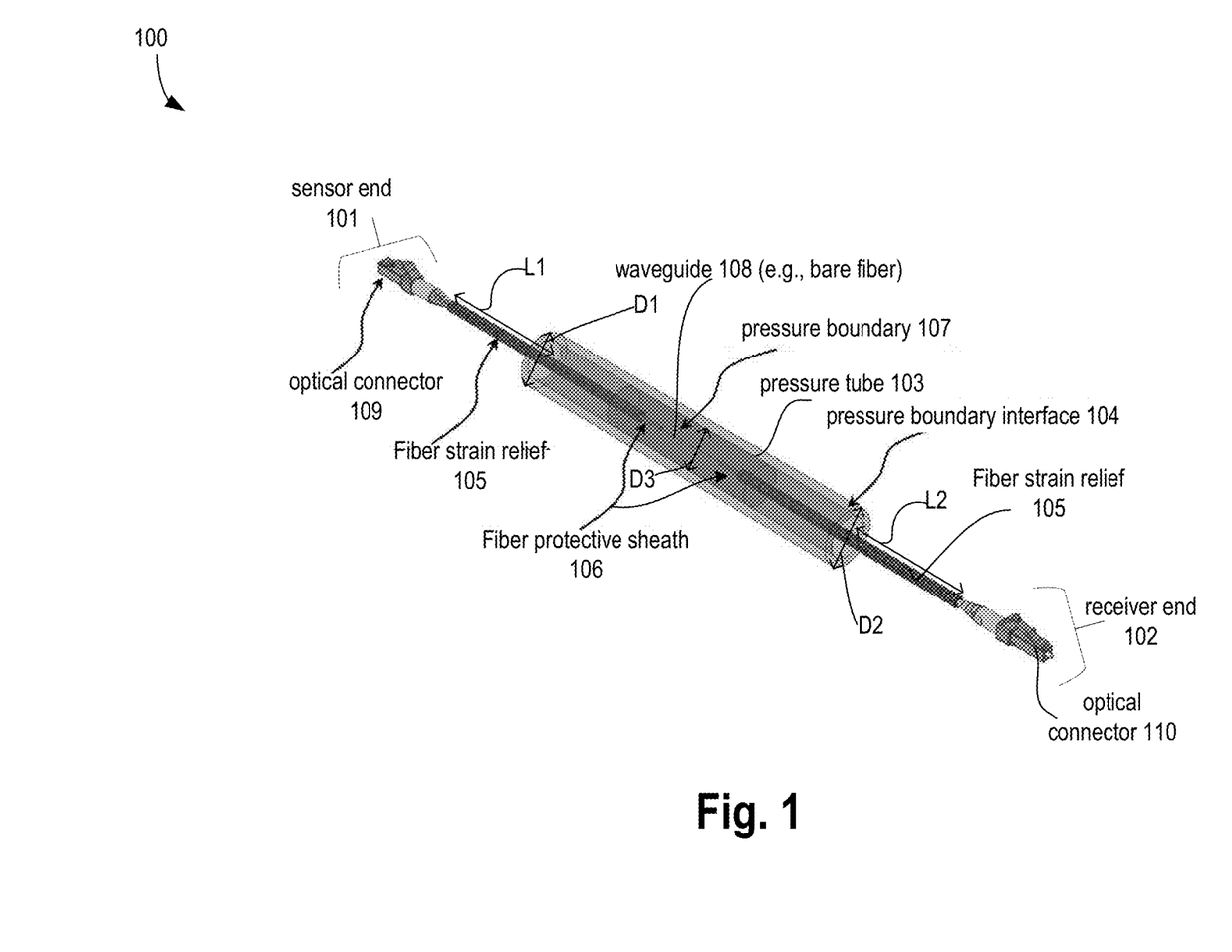
FIG. 1 illustrates an isometric rendering of a pressure pass-thru apparatus, in accordance with some embodiments.

FIG. 1 illustrates an isometric rendering of the pressure pass-thru apparatus 100, in accordance with some embodiments. Apparatus 100 comprises sensor end 101, receiver end 102, pressure tube 103, pressure boundary interface 104, flexible material 105, protective sheath 106, pressure boundary 107, waveguide 108, connector 109, and connector 110. In various embodiments, both ends of apparatus 100 include respective connectors. For example, sensor end 101 has an associated connector 109, and receiver end 102 has an associated connector 110. In some embodiments, waveguide 108 extends from sensor end 101 to receiver end 102.

For simplicity purposes, in various embodiments, waveguide 108 is described as a fiber optic waveguide, and connectors 109 and 110 are optical connectors. However, the embodiments are not limited to such. For example, in some embodiments, fiber optic waveguide 108 is replaced with any suitable flexible waveguide. Flexible waveguide can carry one or more signals. For example, flexible waveguide can carry optical, electrical, ultrasound, and/or magnetic signals. Depending on the type of waveguide in use in pressure tube 103, connectors 109 and 110 can be replaced with corresponding suitable connectors. For example, connector 108 and 110 may include LC (inductor-capacitor) connections for optical, and other connectors for ultrasound, magnetic and/or electrical interfaces.

In some embodiments, flexible material 105 covers a portion of fiber 108. In some embodiments, flexible material 105 comprises a fiber strain relief material. In some embodiments, the portion of fiber 108 extending towards sensor end 101 is covered with fiber strain relief covering 105. In some embodiments, a portion of fiber 108 extending towards receiver end 102 is covered with another fiber strain relief covering 105. Portions of the two fiber strain relief material 105 are inside (or embedded) in pressure tube 103, while portions of fiber strain relief material 105 are outside of pressure tube 103. Portions of fiber strain relief material 105 outside of pressure tube 103 are adjacent to connectors 109 and 110, respectively. Any suitable material can be used for fiber strain relief material 105 that can withstand high pressure and temperature. For example, fiber strain relief material 105 covering can withstand about 500° F. temperature and up to approximately 800 psig. In some embodiments, fiber strain relief material 105 comprises a woven fiberglass material. However, any material can be used for fiber strain relief material 105 so long as that material allows an epoxy or similar material to adhere with it satisfactorily under the conditions in which apparatus 100 is used. In some embodiments, there is no lower limit on pressure.

In some embodiments, one of the ends of flexible material 105 coverings attach to the respective connectors (e.g., at sensor end 101 and receiver end 102). In some embodiments, another of the ends of flexible material 105 coverings is attached to protective sheaths 106 (e.g., fiber protective sheath). Any suitable material may be used for protective sheaths 106. For example, PTFE (polytetrafluoroethylene) tubing can be used for protective sheaths 106. Other materials for the fiber protective sheaths include perfluoroalkoxy alkane (PFA), fluorinated ethylene propylene (FEP), ethylene tetra-fluoroethylene (ETFE), etc.

In some embodiments, these ends and protective sheaths 106 are housed in pressure tube 103 comprising a flexible material covering. In some embodiments, the flexible material is covered by a thin layer of metal (e.g., heavy walled copper, aluminum, stainless steel, titanium, zirconium, etc.). In some embodiments, the fiber or waveguide between protective sheaths 106 is bare fiber 108 or bare waveguide. For example, the fiber between protective sheaths 106 and housed inside the flexible tube 103 is not covered by a strain relief covering and left bare so that it is flexible. Leaving that section of the fiber or waveguide bare also allows for a full seal around fiber 108. For example, if a seal is applied around the outer layer without the bare fiber section, a path through the pressure boundary may be left open.

In various embodiments, pressure boundary interface 104 has a flexible material which comprises epoxy. In some embodiments, the region between pressure boundary interface 104 and pressure tube 103 is filled with the flexible material. In some embodiments, the region inside pressure tube 103 is filled with the flexible material. In some embodiments, the pressure that apparatus 100 can withstand is limited by the properties of the flexible material (e.g., TypeBond epoxy) that is used as the filler material within tube or housing 103 (e.g., the thin layer of metal) and the thickness of the epoxy. In some embodiments, the epoxy is the limiting component on the maximum temperature of 500° F. However, other materials than epoxy may have a different limiting temperature threshold for the apparatus. In various embodiments, apparatus 100 can withstand a strain in the range of approximately 8 micro-strain to 10,000 micro-strain.

In some embodiments, the length L1 of fiber strain relief 105 from an edge of the flexible cover housing 103 (e.g., pressure tube) and optical connector 109 ranges from 1 to 12 inches. In some embodiments, the length L2 of the fiber strain relief 105 from an edge of flexible cover housing 103 and optical connector 110 ranges from 1 to 12 inches. In some embodiments, L1 is substantially equal to L2. In some embodiments, L1 is greater than L2. In some embodiments, L1 is shorter than L2. In some embodiments, flexible cover housing 103 is cylindrical in shape. However, other shapes such as rectangular can also be used. In some embodiments, the flexible cover housing 103 has a diameter ranging from 0.5 to 5 inches. For example, diameter D1 and D2 is substantially the same and range from 0.5 to 5 inches. In some cases, the diameter size is limited by the size of the connectors 109, 110 in use. For example, in one example the diameter is around 5/8 inches.

In some embodiments, flexible tube 103 and its boundary cover 107 are tapered. For example, the diameter D1 is larger than diameter D2. In one such example, the tapered end with smaller diameter is the end that pushes into the pressure boundary while the larger diameter part of the housing secures the pressure boundary. In some embodiments, diameter D1 is smaller than the diameter D2. In some embodiments, the minimum diameter range of the inner tubing diameter D3 is 5/16 while maximum diameter is just under the diameter of D1 or D2.

Figure 2:
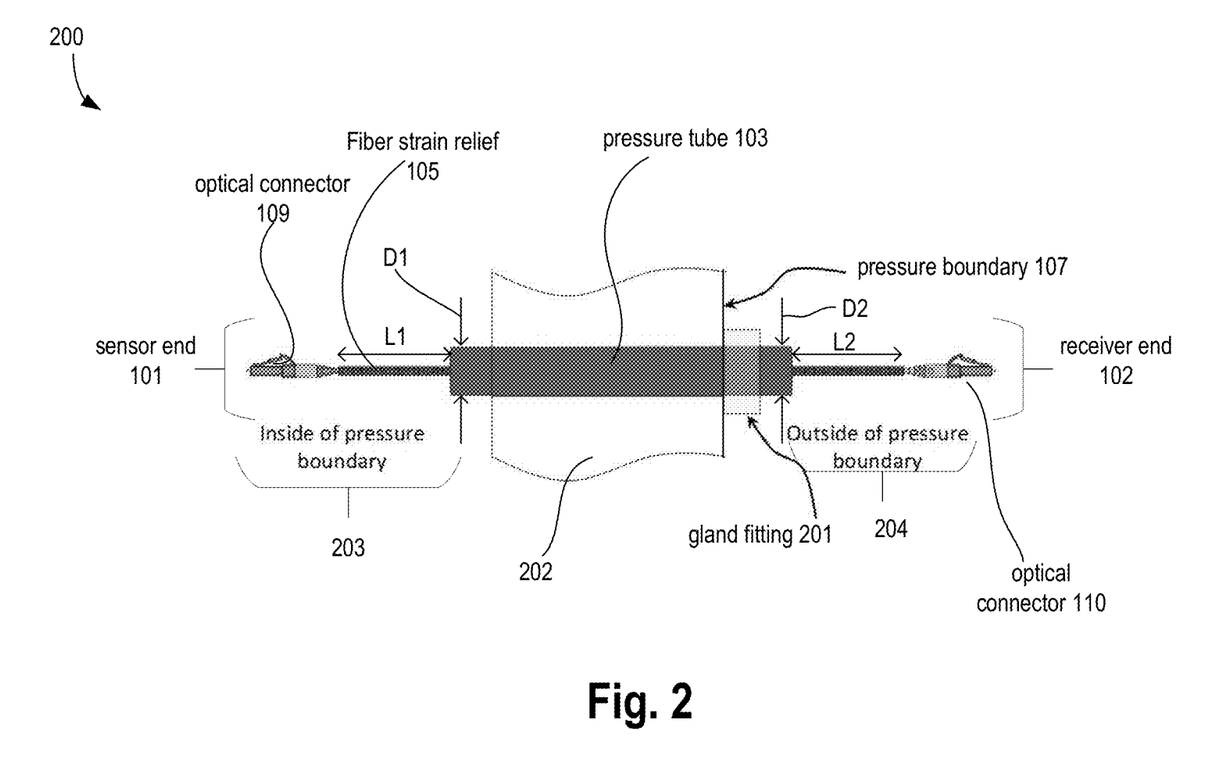
FIG. 2 illustrates a cross-section rendering of the pressure pass-through apparatus, in accordance with some embodiments.

FIG. 2 illustrates cross-section 200 of pressure pass-through apparatus 100, in accordance with some embodiments. Cross-section 200 shows a swaged gland fitting 201 on one side of housing (pressure tube) 103. In some embodiments, swaged gland fitting 201 secures receiver end 102 of apparatus 100 against pressure boundary 202. In some embodiments, swaged gland fitting 201 comprises screws or threads that allow fastening with pressure boundary 202. In some embodiments, swaged gland fitting 201 are commercial-off-the-shelf (COTS) fitting such as those provided by Swagelok™. Here, part of apparatus 100, which is inside the pressure zone or boundary, is portion 203, while the part of apparatus 100, which is outside of the pressure zone or boundary, is portion 204.

Figure 3:
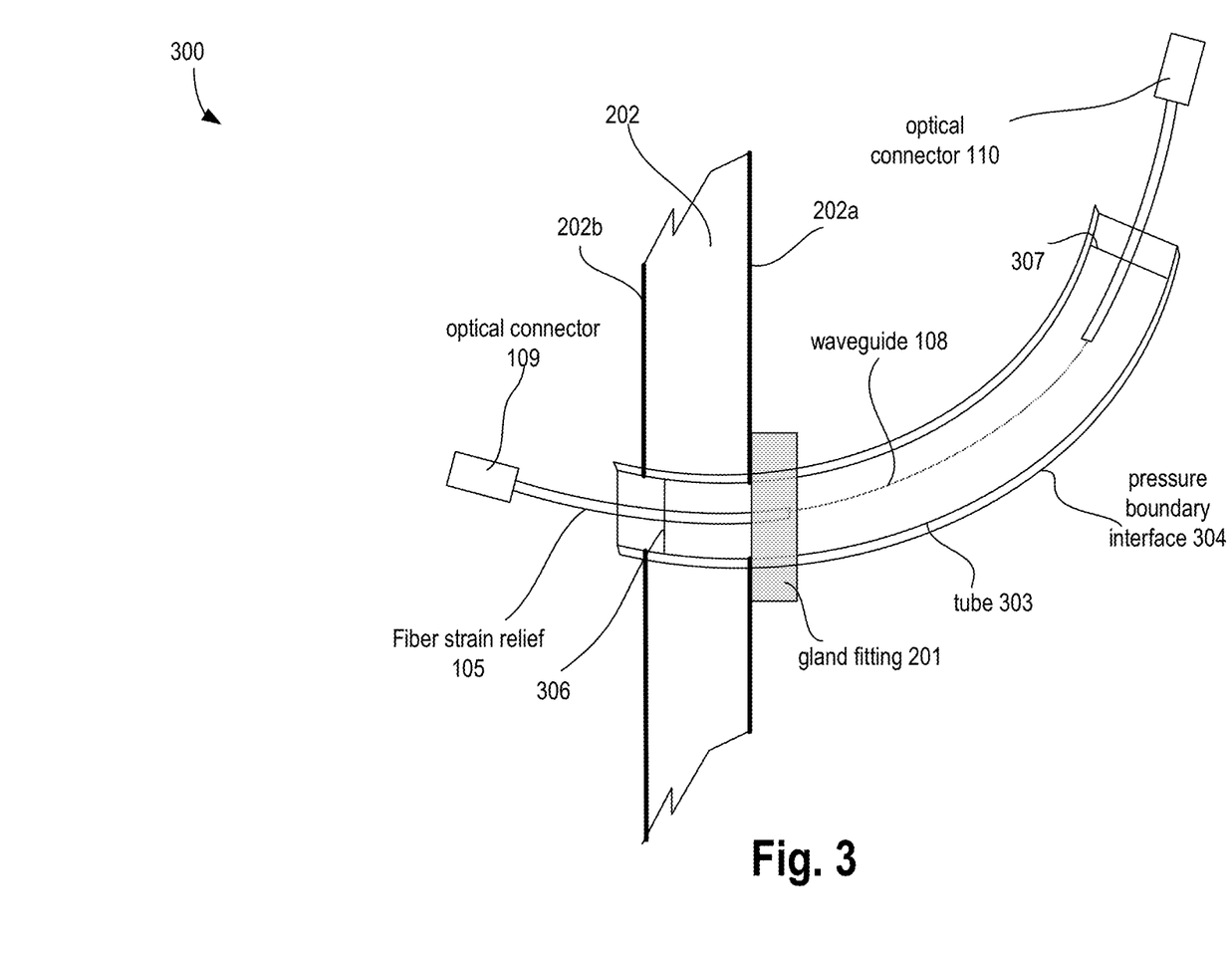
FIG. 3 illustrates a curved pressure pass-through apparatus, in accordance with some embodiments.

FIG. 3 illustrates a curved pressure pass-through apparatus 300, in accordance with some embodiments. Apparatus 300 is similar to apparatus 100 but for the tube 203 and pressure boundary interface 204 being curved as indicated by tube 303 and interface 304, respectively. In various embodiments, using the epoxy as the filler material inside the metal tubing, and by keeping a portion of the fiber bare inside the housing allows for apparatus 300 to be flexible. As such, apparatus 100 can be oriented in any suitable manner to insert it into the pressure zone. Here, the outer pressure boundary is 202b and the inner pressure boundary is 202a.

Figure 4:
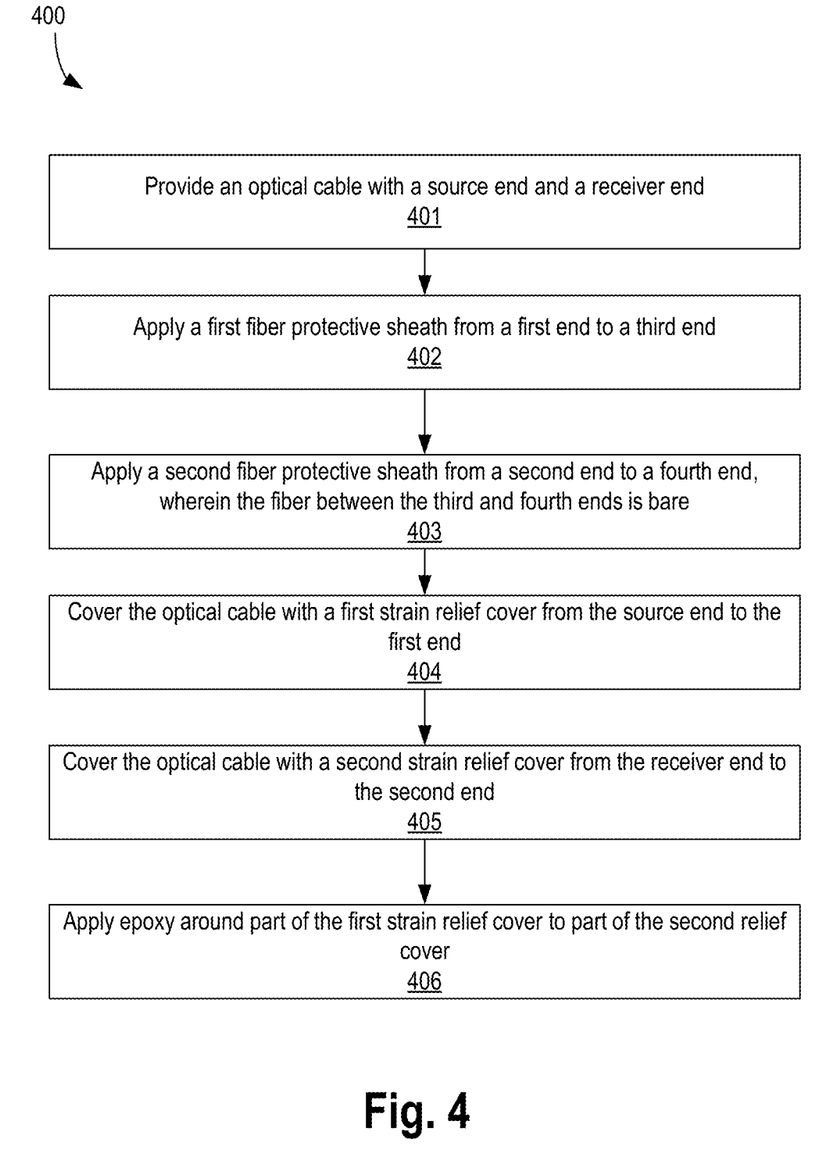
FIG. 4 illustrates a method for forming the pressure pass-through apparatus, in accordance with some embodiments.

FIG. 4 illustrates flowchart 400 showing method for forming the pressure pass-through apparatus, in accordance with some embodiments. Flowchart 400 provides one scheme of fabricating apparatus 100. However, a person skilled in the art would appreciate that some processes in this method can be combined with other processes, and that the order of the processes (or operation blocks) can change to achieve the same outcome. For example, some steps or processes of flowchart 400 can be performed simultaneously.

At block 401, a waveguide (e.g., an optical fiber) 108 is provided with a source end 101 and a receiver end 102. At block 402, a first protective sheath 106 is applied to waveguide 108 from a first end to a third end. The first and third ends are the edges of protective sheath 106 of FIG. 1 and begin from the edge of the bare waveguide 108 to the edge where strain relieve 105 begins in tube 103 towards sensor end 101.

At block 403, a second protective sheath is applied from a second end to a fourth end. The second and fourth ends are the edges of protective sheath 106 of FIG. 1 and begin from the edge of the bare waveguide 108 to the edge where strain relief 105 begins in tube 103 towards receiver end 102. The second fiber protective sheath 106 extends from bare waveguide 108 towards receiver end 102 and ends where the strain relief covering starts. Waveguide 108 between the second and third ends is left bare. This allows waveguide 108 to assume the shape of pressure tube 103 when pressure tube 103 is bent, for example.

At block 404, a first strain relief cover 105 is applied from sensor end 101 to the first end of first protective sheath 106. First strain relief cover 105 begins from connector interface 109 and extends through tube 103 and ends at the edge where first protective sheath 106 begins.

At block 405, a second strain relief cover is applied to the waveguide from receiver end 102 to the second end of second protective sheath 106. The second strain relief cover 105 begins from connector interface 110 and extends through tube 103 and ends at the edge where the second protective sheath 106 begins. At block 406, a filling material (e.g., epoxy) is applied around a portion of the first strain relief cover to part of the second relief cover. The filling material is also applied inside tube 103. In some embodiments, the filling material is applied between boundary interface 104 and tube 103.

In various embodiments, the small fiber-optic section is passed-through a section of tubing 103. This fiber is then suspended to maintain itself approximately within the centerline of tube 103. The tube is then potted with high-temperature epoxy and cured. Swaged end-fittings 201 are affixed to the ends of the tubing 103 to allow apparatus 100 to seal with pressure boundary 202 (e.g., wall).

Figure 5:
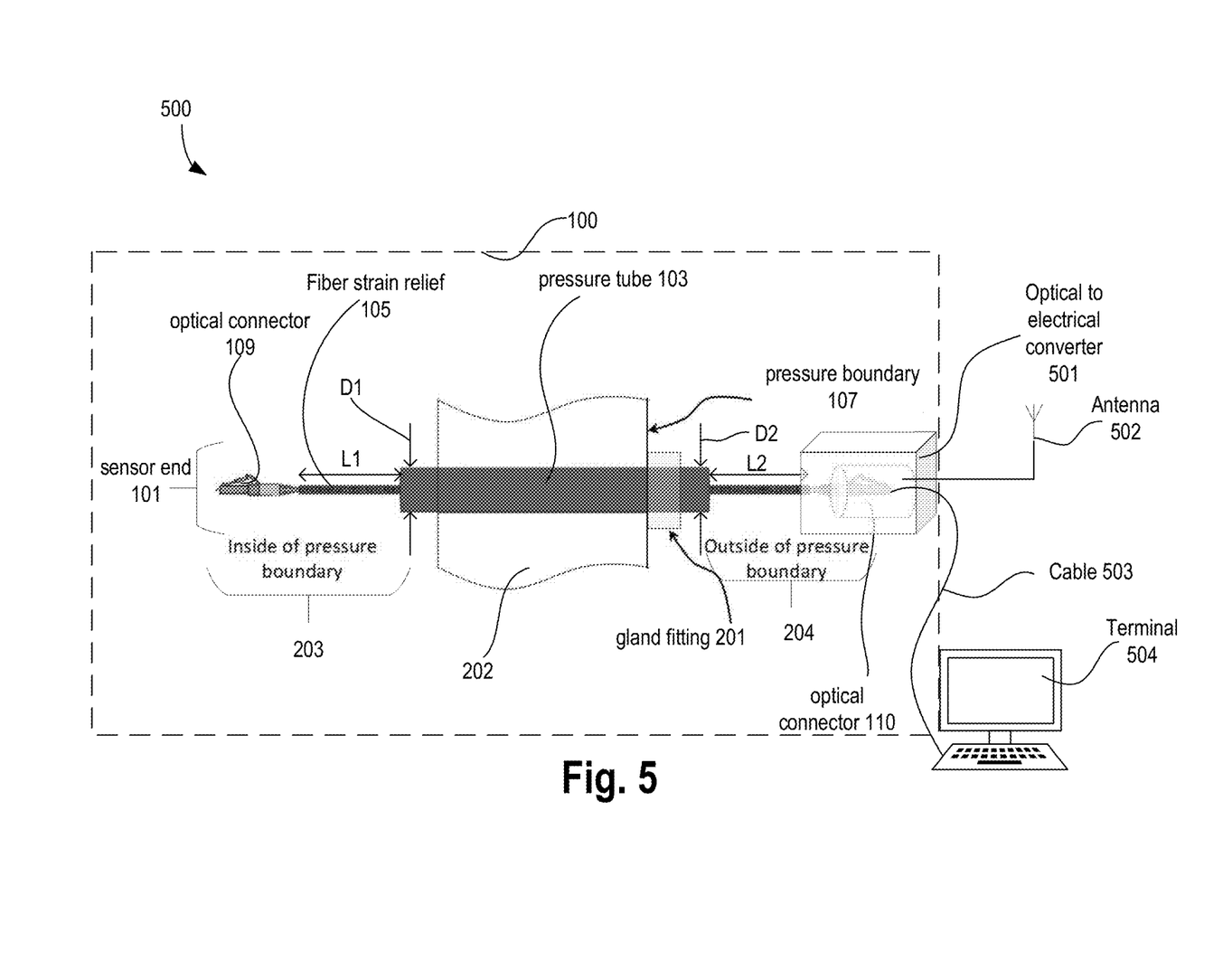
FIG. 5 illustrates a system for sensing a parameter using the pressure pass-through apparatus under a high-pressure environment, in accordance with some embodiments.

FIG. 5 illustrates system 500 for sensing a parameter using the pressure pass-through apparatus under a high-pressure environment, in accordance with some embodiments. System 400 illustrates a usage model of apparatus 100. System 500 comprises pressure pass-through apparatus 100, optical-to-electrical converter 501, antenna 502, cable 503, and terminal 504. In various embodiments, receiver end 102 is connected to optical-to-electrical converter 501, which is then coupled to a terminal (e.g., a computer). In some embodiments, the electrical signal generated by converter 501 is transmitted wirelessly via antenna 502 to another device (e.g., a server or cloud) for processing.

In some embodiments, antenna 502 may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, Antenna(s) 101 are separated to take advantage of spatial diversity. In some embodiments, the sensor at the sensor end 101 is calibrated before it is put to use in pressure boundary 203.

In some embodiments, a connectivity interface is provided which is communicatively coupled to optical-to-electrical converter 501, antenna 502, and/or cable 503. In some embodiments, the connectivity interface comprises cellular connectivity and wireless connectivity. Cellular connectivity refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, cable 503 comprises one or more of: a Universal Serial Bus (USB) complaint cable (which can include any of a number of different hardware interfaces), DisplayPort complaint cable including MiniDisplayPort (MDP), High Definition Multimedia Interface (HDMI), Firewire, or other types of cables.

In some embodiments, sensor data from sensor end 101 is converted to electrical signal by converter 501 at receiver end 102. This electrical signal is then processed by terminal 504 or any server (or cloud).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

The following examples pertain to further embodiments. Specifics in the examples may be used anywhere in one or more embodiments. All optional features of the apparatus described herein may also be implemented with respect to a method or process.

Example 1

An apparatus comprising: a waveguide having a first end and a second end, wherein the waveguide comprises a flexible material; a first connector coupled to the first end, wherein the first connector comprises a sensor; a second connector coupled to the second end, wherein the second connector is to be coupled to a receiver; a housing between the first and second ends, wherein the housing covers a portion of the waveguide, wherein a portion of the waveguide in the housing is bare; and a covering over the portion of the waveguide which is not bare.

Example 2

The apparatus of example 1, wherein the housing includes one or more of: metal, plastic, or plastic with corrosive material.

Example 3

The apparatus of example 2, wherein the metal includes one or more of: stainless, titanium, or zirconium.

Example 4

The apparatus of example 1 comprising a filing material inside the housing.

Example 5

The apparatus of example 4, wherein the filling material comprises epoxy.

Example 6

The apparatus of example 1 comprising a swaged gland coupled to the housing to secure the apparatus to a pressure boundary.

Example 7

The apparatus of example 1, wherein the bare waveguide has a first end and a second end, wherein the first and second ends of the bare waveguide are coupled to respective protective sheaths.

Example 8

The apparatus of example 1, wherein the portion of the waveguide, which is bare, is coupled to a protective sheath.

Example 9

The apparatus of example 1, wherein the waveguide comprises an optical fiber.

Example 10

The apparatus of example 1, wherein the covering includes one or more of: polytetrafluoroethylene, perfluoroalkoxy alkane, fluorinated ethylene propylene, or ethylene tetra-fluoroethylene.

Example 11

The apparatus of example 1, wherein the housing has a first edge and a second edge, wherein the first edge is closer to the first connector than the second connector, wherein the second edge is closer to the second connector than the first connector, wherein a distance from the first edge to the first connector has range of 1 inch to 12 inches, and wherein a distance from the second edge to the second connector has range of 1 inch to 12 inches.

Example 12

The apparatus of example 11, wherein the distance from the first edge to the first connector is substantially equal to the distance from the second edge to the second connector.

Example 13

The apparatus of example 11, wherein the distance from the first edge to the first connector is different than the distance from the second edge to the second connector.

Example 14

The apparatus of example 11, wherein the housing has a diameter in a range of 0.5 inches to 5 inches.

Example 15

The apparatus of example 11, wherein the housing has a tapered shape with a tapered end, wherein the tapered end is closer to the first connector than the second connector.

Example 16

An apparatus comprising: an optic fiber having a first end and a second end; a first connector coupled to the first end; a second connector coupled to the second end; a housing between the first and second ends, wherein the housing covers a portion of the optic fiber, wherein a portion of the optic fiber in the housing is bare; a filing material inside the housing; and a swaged gland fitting on the housing to secure the apparatus to a pressure boundary, wherein the optic fiber near the first and second ends is covered with a fiber strain relief material.

Example 17

The apparatus of example 16, wherein the filling material comprises epoxy.

Example 18

The apparatus of example 16, wherein ends of the bare fiber are coupled to fiber protective sheath.

Example 19

A system comprising: an optical-to-electrical converter; a pressure pass-through apparatus comprising: an optic fiber having a first end and a second end; a first connector coupled to the first end; a second connector coupled to the second end and also coupled to the optical-to-electrical converter; a housing between the first and second ends, wherein the housing covers a portion of the optic fiber, wherein a portion of the optic fiber in the housing is bare; a filing material inside the housing; and a swaged gland fitting on the housing to secure the apparatus to a pressure boundary, wherein the optic fiber near the first and second ends is covered with a fiber strain relief material; and a communication interface communicatively coupled to the optical-to-electrical converter.

Example 20

The system of example 19, wherein the communication interface includes one or more of: an antenna and a computer interface.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a waveguide having a first end and a second end, wherein the waveguide comprises a flexible material;
   a first connector coupled to the first end, wherein the first connector comprises a sensor;
   a second connector coupled to the second end, wherein the second connector is to be coupled to a receiver;
   a housing between the first and second ends, wherein the housing covers a portion of the waveguide, and wherein a portion of the waveguide in the housing is bare; and
   a covering over the portion of the waveguide which is not bare.

2. The apparatus of claim 1, wherein the housing includes one or more of: metal, plastic, or plastic with corrosive material.

3. The apparatus of claim 2, wherein the metal includes one or more of: stainless, titanium, or zirconium.

4. The apparatus of claim 1 comprising a filling material inside the housing.

5. The apparatus of claim 4, wherein the filling material comprises epoxy.

6. The apparatus of claim 1 comprising a swaged gland coupled to the housing to secure the apparatus to a pressure boundary.

7. The apparatus of claim 1, wherein the bare waveguide has a first end and a second end, and wherein the first and second ends of the bare waveguide are coupled to respective protective sheaths.

8. The apparatus of claim 1, wherein the portion of the waveguide, which is bare, is coupled to a protective sheath.

9. The apparatus of claim 1, wherein the waveguide comprises an optical fiber.

10. The apparatus of claim 1, wherein the covering includes one or more of: polytetrafluoroethylene, perfluoroalkoxy alkane, fluorinated ethylene propylene, or ethylene tetra-fluoroethylene.

11. The apparatus of claim 1, wherein the housing has a first edge and a second edge, wherein the first edge is closer to the first connector than the second connector, wherein the second edge is closer to the second connector than the first connector, wherein a distance from the first edge to the first connector has a range of 1 inch to 12 inches, and wherein a distance from the second edge to the second connector has a range of 1 inch to 12 inches.

12. The apparatus of claim 11, wherein the distance from the first edge to the first connector is substantially equal to the distance from the second edge to the second connector.

13. The apparatus of claim 11, wherein the distance from the first edge to the first connector is different than the distance from the second edge to the second connector.

14. The apparatus of claim 11, wherein the housing has a diameter in a range of 0.5 inches to 5 inches.

15. The apparatus of claim 11, wherein the housing has a tapered shape with a tapered end, wherein the tapered end is closer to the first connector than the second connector.

16. An apparatus comprising:
an optic fiber having a first end and a second end;
a first connector coupled to the first end;
a second connector coupled to the second end;
a housing between the first and second ends, wherein the housing covers a portion of the optic fiber, and wherein a portion of the optic fiber in the housing is bare;
a filling material inside the housing; and
a swaged gland fitting on the housing to secure the apparatus to a pressure boundary, wherein the optic fiber near the first and second ends is covered with a fiber strain relief material.

17. The apparatus of claim 16, wherein the filling material comprises epoxy.

18. The apparatus of claim 16, wherein ends of the bare optic fiber is coupled to fiber protective sheaths.

19. A system comprising:
an optical-to-electrical converter;
a pressure pass-through apparatus comprising:
an optic fiber having a first end and a second end;
a first connector coupled to the first end;
a second connector coupled to the second end and also coupled to the optical-to-electrical converter;
a housing between the first and second ends, wherein the housing covers a portion of the optic fiber, and wherein a portion of the optic fiber in the housing is bare;
a filing material inside the housing; and
a swaged gland fitting on the housing to secure the apparatus to a pressure boundary, wherein the optic fiber near the first and second ends is covered with a fiber strain relief material; and
a communication interface communicatively coupled to the optical-to-electrical converter.

20. The system of claim 19, wherein the communication interface includes one or more of: an antenna and a computer interface.

* * * * *